(12) United States Patent
Duong et al.

(10) Patent No.: US 6,345,874 B2
(45) Date of Patent: *Feb. 12, 2002

(54) CABINET MOUNTING STRUCTURE

(75) Inventors: Quang Duong, Denville, NJ (US); Barbara M. Gunther, Saylorsburg, PA (US); Ralph Liguori, Oakland, NJ (US); Damon C. Owens, W. Orange, NJ (US); Dana L. Ross, Vernon, NJ (US); Philip C. Sinclair, Carleton Place (CA)

(73) Assignee: Avaya Technologies Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,074

(22) Filed: Sep. 23, 1999

(51) Int. Cl.[7] .............................................. A47B 91/08
(52) U.S. Cl. ...................... 312/351.1; 312/245; 248/500
(58) Field of Search .......................... 312/351.1, 351.3, 312/351.5, 351.7, 351.8, 249.1, 242, 245, 351.14, 246; 248/551, 500, 680, 223.41, 222.11, 224.7, 501, 637; 52/27, 578, 293.3

(56) References Cited

U.S. PATENT DOCUMENTS

| | | | | |
|---|---|---|---|---|
| 1,790,977 A | * | 2/1931 | De Boer | 312/245 X |
| 2,857,229 A | * | 10/1958 | Sitler | 312/351.1 |
| 3,113,358 A | * | 12/1963 | Zell et al. | 312/263 |
| 3,403,641 A | * | 10/1968 | Baker | 248/222.11 X |
| 3,675,955 A | * | 7/1972 | Hajduk | 312/111 X |
| 4,153,313 A | * | 5/1979 | Propst | 312/265.6 X |
| 5,083,738 A | * | 1/1992 | Infanti | 248/500 |
| 5,176,437 A | * | 1/1993 | Remington | 312/351.1 |
| 5,192,123 A | * | 3/1993 | Wallin | 312/351.7 |
| 5,222,611 A | * | 6/1993 | Wood et al. | 312/245 X |
| 5,601,273 A | * | 2/1997 | Avganim | 248/551 |
| 5,624,098 A | * | 4/1997 | McDowell | 248/500 X |
| 5,690,311 A | * | 11/1997 | Leighton et al. | 248/500 X |
| 5,692,722 A | * | 12/1997 | Lundagards | 248/500 X |
| 5,775,664 A | * | 7/1998 | Martin | 248/500 |

FOREIGN PATENT DOCUMENTS

FR            2404411     *  6/1979    ................. 312/245

* cited by examiner

Primary Examiner—James O. Hansen
(74) Attorney, Agent, or Firm—David L. Davis

(57) ABSTRACT

Cabinet mounting structure where the rear of the cabinet is inaccessible. The structure includes anchors mounted to the rear of the cabinet. A base plate having receptacles secured thereon is installed on a supporting surface. The receptacles are formed with cavities into which the anchors are inserted, thereby holding down the rear of the cabinet. The front of the cabinet is secured to the supporting surface by mounting bolts extending through the cabinet floor.

7 Claims, 4 Drawing Sheets

CABINET MOUNTING STRUCTURE

BACKGROUND OF THE INVENTION

This invention relates to cabinets holding electronic equipment and, more particularly, to structure for effecting the mounting of such a cabinet.

Electronic equipment, particularly telecommunications equipment, is typically installed within a cabinet. In the past, such cabinets were commonly positioned away from walls in order to access the rear of the cabinet. However, providing such rear access is wasteful of floor space. Accordingly, a need has arisen for such cabinets to be positioned either against a wall or back-to-back with other cabinets to provide "front access only" capability, similar to a traditional refrigerator.

For telecommunications equipment cabinets, a requirement exists that the cabinet be secured to its supporting surface so that it is capable of withstanding Zone 4 earthquake vibration. In the past, such mounting was typically provided by using four mounting bolts through openings in the cabinet floor. These mounting bolts are located with two toward the front of the cabinet and two toward the rear of the cabinet. The two mounting bolts in the front are easily accessible. However, the two mounting bolts in the rear are not accessible if the cabinet is fully populated with electronics and the cabinet is positioned with its rear against a wall and with other cabinets on both sides of it. Accordingly, a need exists for front access cabinet mounting structure which allows easy installation and access in the field and is capable of satisfying the vibration requirement.

SUMMARY OF THE INVENTION

According to the present invention, there is provided at least one receptacle mounted to the cabinet supporting surface and having at least one cavity open in a direction parallel to the supporting surface. At least one anchor is secured to a side of the cabinet, the anchor having an exterior configuration complementary to a respective cavity. The anchor is located on the cabinet side so that the cabinet can be moved parallel to the supporting surface until the anchor enters the respective cavity. Thus, the receptacles can be mounted adjacent to a wall and the anchors can be mounted to the rear of the cabinet, so that the cabinet can be slid up against the wall so that the anchors are held in the receptacle cavities. Mounting bolts can then be installed in the front of the cabinet.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
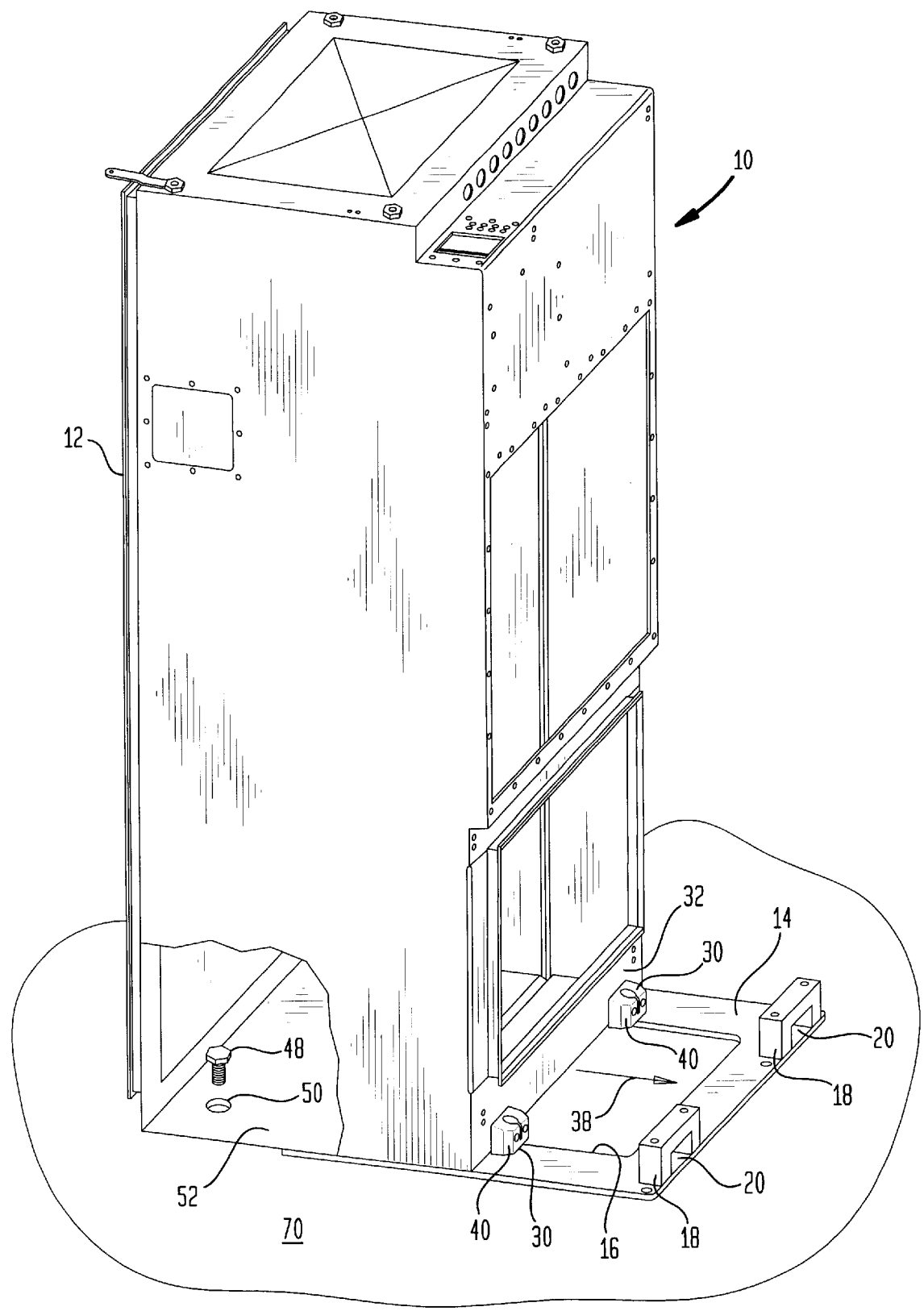
FIG. 1 is a perspective view, partially cut away, of a cabinet and cabinet mounting structure according to an illustrative embodiment of the present invention.

Referring now to the drawings, FIG. 1 shows a cabinet, designated generally by the reference numeral 10, having an access door 12 at its front. According to an illustrative embodiment of the present invention, there is provided a base plate 14. The base plate 14 is preferably rectangular in shape, illustratively with a central opening 16. The base plate 14 may be formed from a ¼" thick steel plate.

Figure 5:
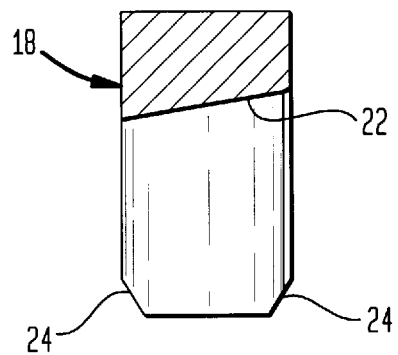
FIG. 5 is a cross sectional view taken along the line 5—5 in FIG. 4.

Mounted to the base plate 14 are two receptacles 18. Each of the receptacles 18 is a generally C-shaped block mounted with the open side of the C adjacent to the base plate 14. This mounting of each receptacle 18 provides a cavity 20 open in a direction parallel to the surface of the base plate 14. The roof 22 of the cavity 20 is tapered downwardly, as best shown in FIG. 5.

Figure 2:
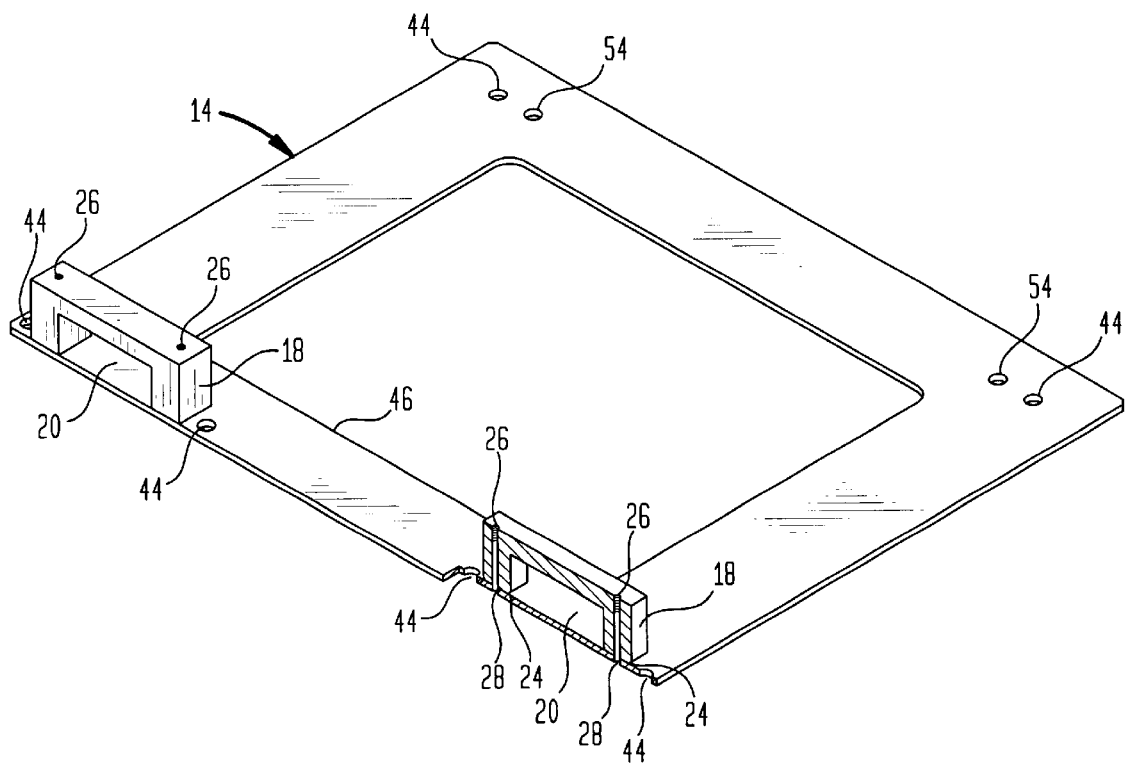
FIG. 2 is a perspective view, partially sectioned, of the inventive base plate and receptacles of the embodiment of FIG. 1.
Figure 3:
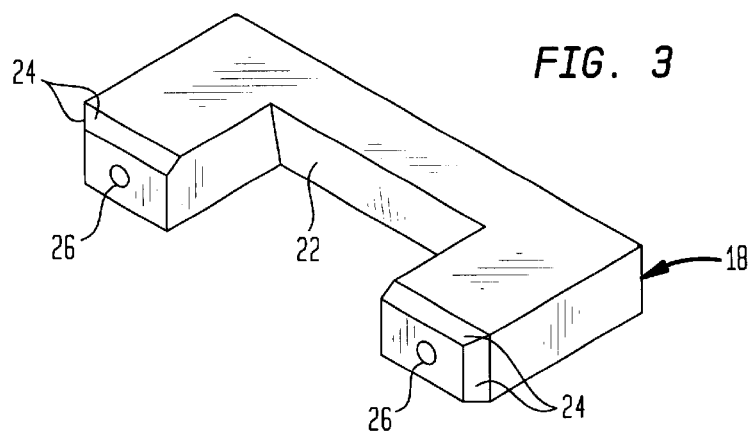
FIG. 3 is a front perspective view of an inventive receptacle of the embodiment of FIG. 1.
Figure 4:
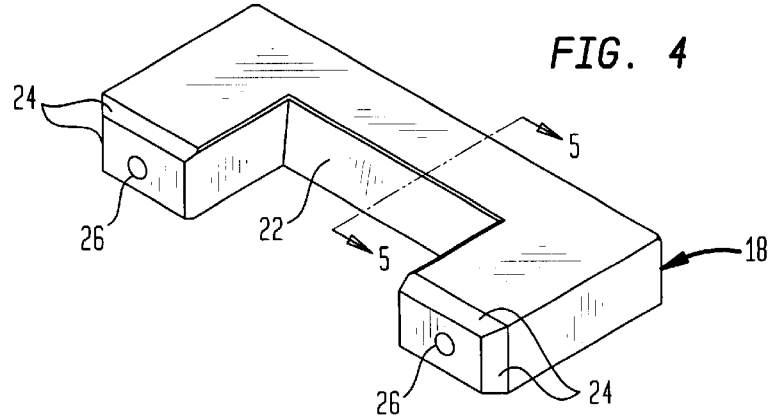
FIG. 4 is a rear perspective view of an inventive receptacle of the embodiment of FIG. 1.

The ends of the receptacles 18 have beveled edges 24. In addition, the receptacle 18 is formed with a pair of bores 26 which are preferably threaded at their upper ends, as best shown in FIG. 2. For securing the receptacles 18 to the base plate 14, the receptacles 18 are placed on the base plate 14 with their beveled edges 24 adjacent to the base plate 14 and the bores 26 aligned with respective openings 28 formed in the base plate 14. Screws (not shown) are then inserted through the openings 28 and secured to the threaded regions of the bores 26. The receptacle block 18 is then welded to the base plate 14 along the beveled edges 24. The screws may then be removed. As an alternative construction, the receptacles 18 and the base plate 14 can be cast as a unitary piece.

Figure 6:
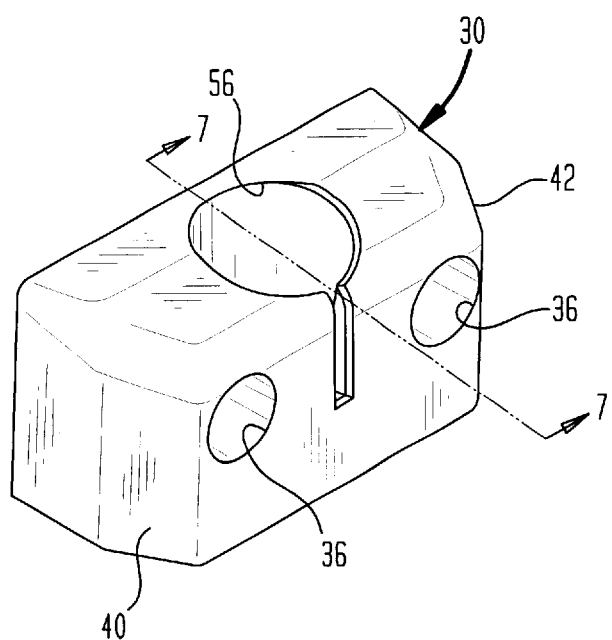
FIG. 6 is a perspective view of an inventive anchor of the embodiment of FIG. 1.
Figure 7:
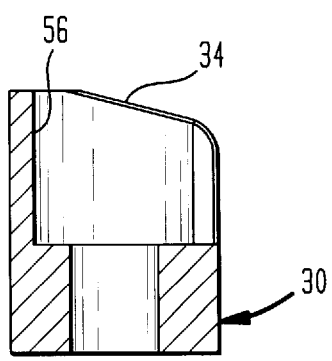
FIG. 7 is a cross sectional view taken along the line 7—7 in FIG. 6.

To cooperate with the receptacles 18, a pair of blocks 30 are secured to the rear 32 of the cabinet 10. The block 30 is substantially complementary to the cavity 20 of the receptacle 18. Thus, the upper surface 34 of the block 30 is tapered downwardly, as best shown in FIG. 7, away from the rear 32 of the cabinet 10. The block 30 is secured to the rear 32 of the cabinet 10 by screws (not shown) inserted through bores 36 of the block 30. The pair of blocks 30 are positioned on the rear 32 of the cabinet 10 so that the cabinet 10 can be moved along the base plate 14, as shown by the arrow 38, and the blocks 30 enter the cavities 20. As best shown in FIG. 6, the opposed sides 40, 42 of the block 30 are tapered inwardly in the direction away from the rear 32 of the cabinet 10. This aids in the insertion of the block 30 in the cavity 20 of the receptacle 18.

When a cabinet 10 is to be installed, the base plate 14, with the receptacles 18 secured thereto, is placed on the supporting surface 70 and secured thereto by mounting bolts, illustratively six in number, extending through the openings 44 in the base plate 14. The cabinet 10 is then placed on the base plate 14 with its rear 32 facing the receptacles 18, as shown in FIG. 1, and then moved in the direction of the arrow 38 until the blocks 30 are within the cavities 20 of the respective receptacles 18. Thus, in the embodiment disclosed herein, the cabinet 10 rests on the base plate 14 when the blocks 30 are within the cavities 20 of the receptacles 18. In the alternative, the base plate 14 can be made significantly smaller by, for example, cutting it off parallel to the edge 46 of the opening 16, or the base plate 14 can be eliminated and the receptacles 18 bolted directly to the supporting surface 70. In any event, after the blocks 30 are seated in the cavities 20, the front of the cabinet 10 is secured to the supporting surface 70 by means of a mounting bolt 48 which is inserted through an opening 50 in the floor 52 of the cabinet 10 and then through an aligned opening 54 in the base plate 14 for engagement with the supporting surface 70. Thus, installation of the cabinet 10 is accomplished entirely from the front of the cabinet 10, even if it is moved up against a wall and there are cabinets on both sides.

In situations where there is room behind the cabinet 10, the block 30 is provided with a vertical bore 56 which can receive a mounting bolt directly therethrough. Thus, even though the cabinet 10 is filled with equipment which prevents access to the rear floor of the cabinet 10, the use of the blocks 30 still permits a secure mounting of the cabinet 10 to a supporting surface 70.

Figure 8:
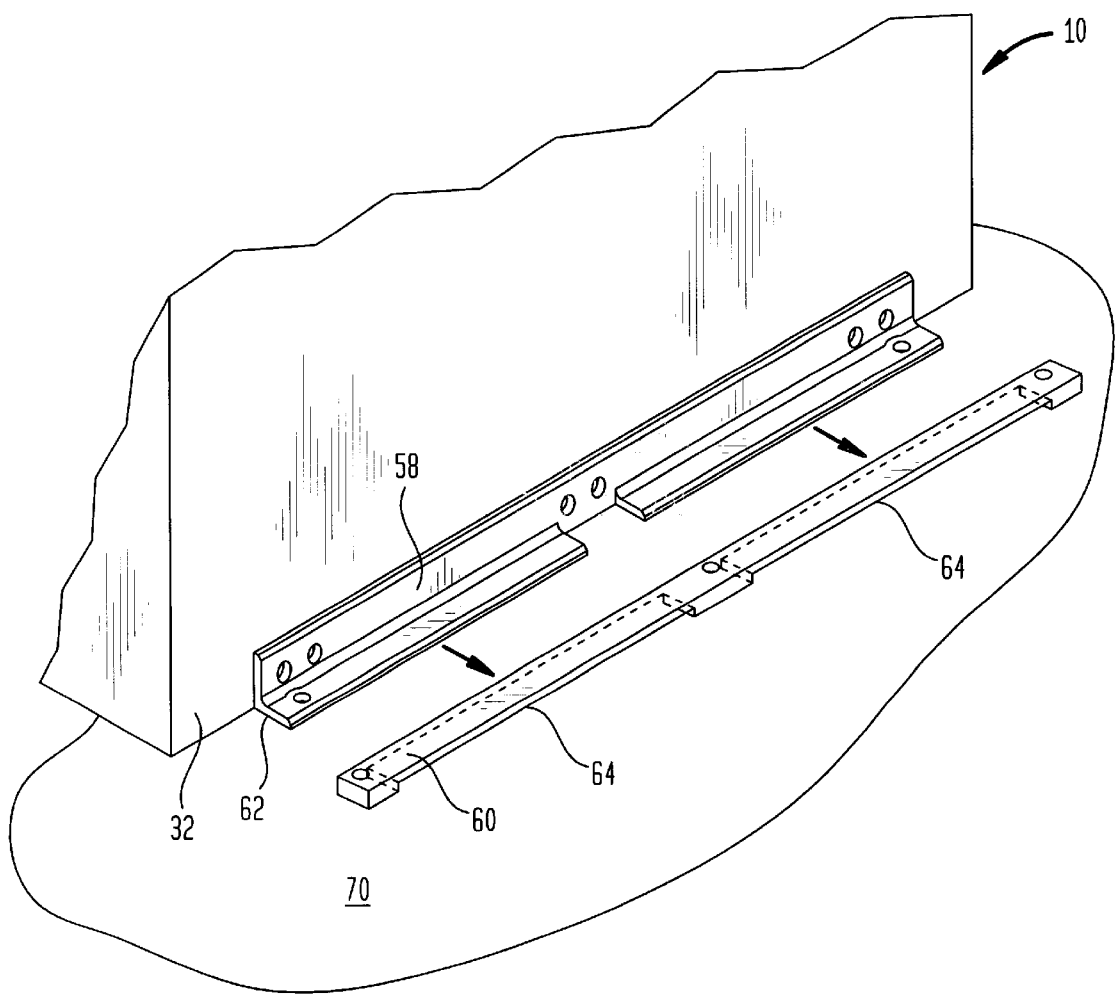
FIG. 8 is a partial rear perspective view of a cabinet and cabinet mounting structure in accordance with another illustrative embodiment of this invention.

In the illustrative embodiment, blocks 30 have been shown as anchoring devices, fitting in cavities of complementary receptacles 18. It is understood that the present invention is not intended to be limited to the specific embodiment shown herein. Other anchor/receptacle pairs are also possible. Thus, as shown in FIG. 8, an angle bracket 58 can be secured to the rear 32 of the cabinet 10 to function as the anchor and a clamping bar 60 secured to and spaced from the supporting surface 70 can be utilized as the receptacle. The base plate is optional. The angle bracket 58 is oriented with its side 62 extending outwardly from the cabinet rear 32 parallel to the supporting surface 70 and at a height such that it can be positioned between the bar 60 and the supporting surface 70 and enter the cavities 64.

Accordingly, there has been disclosed improved structure for effecting the mounting of an electronics cabinet in a location where its rear is inaccessible. While an illustrative embodiment of the present invention has been disclosed herein, it is understood that various adaptations and modifications to the disclosed embodiment are possible, and it is intended that this invention be limited only by the scope of the appended claims.

What is claimed is:

1. In combination, a cabinet, a supporting surface and structure for securing the cabinet to the supporting surface, wherein the cabinet includes a floor parallel to the supporting surface with the floor having at least one opening, and wherein the structure comprises:

at least one receptacle mounted to the supporting surface, said at least one receptacle having at least one cavity open in a first direction toward said cabinet and parallel to the supporting surface;

at least one anchor secured to an exterior side of the cabinet and extending outwardly therefrom in a second direction parallel to the supporting surface, said at least one anchor having an exterior configuration complementary to a respective one of said at least one cavity; and at least one bolt adapted to extend through a respective one of said at least one opening in the cabinet floor and threadingly engage the supporting surface;

wherein said cabinet can be moved parallel to the supporting surface toward said at least one receptacle in a direction to align said first and second directions and to allow said at least one anchor to enter a respective one of said at least one cavity of a respective one of said at least one receptacle mounted to the supporting surface.

2. The combination according to claim 1 further comprising a base plate mounted to the supporting surface and wherein:

the at least one receptacle is mounted to the base plate; and the cabinet rests on the base plate when the at least one anchor is in a respective one of said at least one cavity.

3. The combination according to claim 1 wherein the at least one anchor is a block tapered downwardly in the direction away from the cabinet exterior side.

4. The combination according to claim 1 wherein the at least one anchor is a block tapered along opposed sides inwardly in the direction away from the cabinet exterior side.

5. The combination according to claim 1 wherein the at least one anchor is a block tapered in the direction away from the cabinet exterior side both inwardly along opposed sides and downwardly.

6. The combination according to claim 1 wherein said at least one receptacle comprises a generally C-shaped block mounted with the open side of the C-shape block adjacent to the supporting surface.

7. The combination according to claim 1 wherein:

said at least one receptacle includes a bar mounted parallel to and spaced from said supporting surface; and said at least one anchor includes an angle bracket located on said cabinet exterior side so that an outwardly extending portion thereof is parallel to the supporting surface and positionable between the bar and the supporting surface.

* * * * *